(12) United States Patent
Chen et al.

(10) Patent No.: US 11,362,928 B2
(45) Date of Patent: Jun. 14, 2022

(54) METHOD, ELECTRONIC DEVICE AND COMPUTER PROGRAM PRODUCT FOR GENERATING NETWORK TOPOLOGY

(71) Applicant: EMC IP Holding Company LLC, Hopkinton, MA (US)

(72) Inventors: Tianxiang Chen, Shanghai (CN); Zhi Ying, Shanghai (CN); Pengfei Wu, Shanghai (CN); Jinpeng Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 265 days.

(21) Appl. No.: 16/791,583

(22) Filed: Feb. 14, 2020

(65) Prior Publication Data

US 2021/0135974 A1    May 6, 2021

(30) Foreign Application Priority Data

Nov. 1, 2019  (CN) .......................... 201911058572.4

(51) Int. Cl.
  *H04L 45/02*    (2022.01)
  *H04L 45/12*    (2022.01)
  *H04L 45/24*    (2022.01)
  *H04L 45/00*    (2022.01)
  *H04L 45/42*    (2022.01)

(52) U.S. Cl.
  CPC ............ *H04L 45/02* (2013.01); *H04L 45/123* (2013.01); *H04L 45/14* (2013.01); *H04L 45/20* (2013.01); *H04L 45/24* (2013.01); *H04L 45/42* (2013.01)

(58) Field of Classification Search
  CPC ......... H04L 45/02; H04L 45/14; H04L 45/20; H04L 45/24; H04L 45/42; H04L 45/123
  See application file for complete search history.

(56) References Cited

U.S. PATENT DOCUMENTS

| | | | |
|---|---|---|---|
| 2012/0106358 A1* | 5/2012 | Mishra | H04L 43/00 370/242 |
| 2019/0081884 A1* | 3/2019 | Spohn | H04L 45/124 |

OTHER PUBLICATIONS

Wikipedia, "Service-Level Objective," https://en.wikipedia.org/wiki/Service-level_objective, Dec. 16, 2019, 3 pages.

(Continued)

*Primary Examiner* — Brian P Cox
(74) *Attorney, Agent, or Firm* — Ryan, Mason & Lewis, LLP

(57) ABSTRACT

Techniques for generating a network topology are provided. For example, a method comprises: sending, at an edge node of a network, first exploration data to a first node of the network. The method also comprises receiving from the first node first feedback information for the first exploration data. The first feedback information includes identity information of the first node and first associated node list information, and the first associated node list information includes identity information of nodes associated with the first node in the network. In addition, the method comprises: determining latency between the first node and the second node based on the first latency information and the second latency information. Then, the method further comprises updating the network topology based on the latency between the first node and the second node. Through the method, the present disclosure can provide accurate data support for path optimization.

20 Claims, 7 Drawing Sheets

(56) References Cited

OTHER PUBLICATIONS

Wikipedia, "Quality of Service," https://en.wikipedia.org/wiki/Quality_of_service, Feb. 7, 2020, 12 pages.
Wikipedia, "Resource Reservation Protocol," https://en.wikipedia.org/wiki/Resource_Reservation_Protocol, Jan. 16, 2020, 5 pages.
Wikipedia, "Software-Defined Networking," https://en.wikipedia.org/wiki/Software-defined_networking, Feb. 12, 2020, 13 pages.
U.S. Appl. No. 16/537,117 filed in the name of Zhi Ying et al. filed Aug. 9, 2019 and entitled "Method, Device and Computer Program Product for Path Optimization."

* cited by examiner

METHOD, ELECTRONIC DEVICE AND COMPUTER PROGRAM PRODUCT FOR GENERATING NETWORK TOPOLOGY

RELATED APPLICATION(S)

The present application claims priority to Chinese Patent Application No. 201911058572.4, filed Nov. 1, 2019, and entitled "Method, Electronic Device and Computer Program Product for Generating Network Topology," which is incorporated by reference herein in its entirety.

FIELD

Embodiments of the present disclosure generally relate to the field of computer networks, and more specifically, to a method, an electronic device and a computer program product for generating a network topology.

BACKGROUND

In a legacy network architecture, when considering the problem of how data are forwarded from a source to a destination, technologies (such as, a routing protocol, Quality of Service (QoS), a Resource Reservation Protocol (RSVP), a Software Defined Network (SDN), and the like) are generally employed. For example, in most cases involving a routing protocol, a router makes a routing decision for a next hop router based on a best-effort strategy, which means that a router only forwards data to the router being allegedly closest to the destination. However, the best-effort strategy is not appropriate for all types of network traffic such that network performance cannot be guaranteed. The technologies related to QoS include traffic classification, a queuing and shaping method, a strategy control method, and the like. Such technologies are based on data labels or stream information and are statically configured on a network device, which typically does not support application awareness and lacks an acknowledgement of the entire picture of the data flow. Hence, there is a need for effective techniques for detecting a network topology, so as to provide reliable support for path optimization.

SUMMARY

Embodiments of the present disclosure provide a method, an electronic device and a computer program product for generating a network topology.

In a first aspect of the present disclosure, there is provided a method of generating a network topology. The method comprises: sending, at an edge node of a network, first exploration data to a first node of the network. The method also comprises receiving, from the first node, first feedback information for the first exploration data, the first feedback information including identity information of the first node and first associated node list information, the first associated node list information including identity information of nodes associated with the first node in the network. In addition, the method comprises determining, based on the first feedback information, first latency information of the first exploration data from the edge node to the first node. The method further comprises updating the network topology based on the identity information of the first node, the first associated node list information and the first latency information.

In a second aspect of the present disclosure, there is provided a method of generating a network topology. The method comprises receiving, at a first node of a network, first exploration data from an edge node of the network. The method further comprises determining first feedback information for the first exploration data, the first feedback information including identity information of the first node and first associated node list information, the first associated node list information including identity information of nodes associated with the first node in the network. Moreover, the method comprises sending, to the edge node, the first feedback information for updating the network topology.

In a third aspect of the present disclosure, there is provided an electronic device. The electronic device comprises: at least one processing unit; and at least one memory coupled to the at least one processing unit and storing instructions for execution by the at least one processing unit, the instructions, when executed by the at least one processing unit, causing the device to perform acts comprising: sending, at an edge node of a network, first exploration data to a first node of the network; receiving, from the first node, first feedback information for the first exploration data, the first feedback information including identity information of the first node and first associated node list information, the first associated node list information including identity information of nodes associated with the first node in the network; determining, based on the first feedback information, first latency information of the first exploration data from the edge node to the first node; and updating the network topology based on the identity information of the first node, the first associated node list information and the first latency information.

In a fourth aspect of the present disclosure, there is provided an electronic device. The electronic device comprises: at least one processing unit; and at least one memory coupled to the at least one processing unit and storing instructions for execution by the at least one processing unit, the instructions, when executed by the at least one processing unit, causing the device to perform acts comprising: receiving, at a first node of a network, first exploration data from an edge node of the network; determining first feedback information for the first exploration data, the first feedback information including identity information of the first node and first associated node list information, the first associated node list information including identity information of nodes associated with the first node in the network; and sending, to the edge node, the first feedback information for updating the network topology.

In a fifth aspect of the present disclosure, there is provided a computer program product tangibly stored on a non-transitory computer-readable medium and including machine-executable instructions. The machine-executable instructions when executed cause a device to execute any step of the method as described in the first or second aspect of the present disclosure.

This Summary is provided to introduce a selection of concepts in a simplified form that are further described below in the Detailed Description. This Summary is not intended to identify each key feature or essential feature of the present disclosure, nor is it intended to be used to limit the scope of the present disclosure.

BRIEF DESCRIPTION OF THE DRAWINGS

The above and other objectives, features and advantages of the present disclosure will become more apparent, through the detailed description of the example embodiments of the present disclosure with reference to the accompanying drawings, where the same reference symbols generally refer to the same elements in the example embodiments of the present disclosure.

Throughout the drawings, the same or similar reference symbols refer to the same or similar elements.

DETAILED DESCRIPTION

Figure 1:
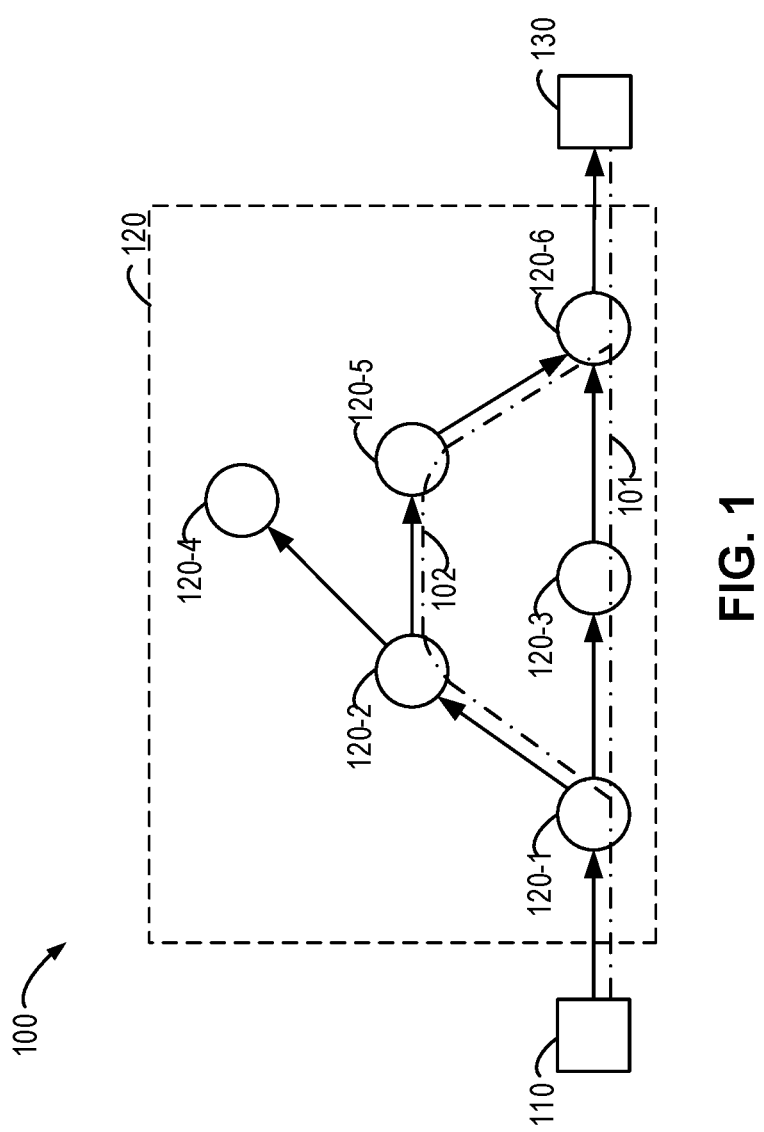
FIG. 1 illustrates a schematic diagram of an example network in which embodiments of the present disclosure can be implemented therein.

Illustrative embodiments of the present disclosure will now be described in detail with reference to the accompanying drawings. Although some illustrative embodiments of the present disclosure are shown in the drawings, it would be appreciated that the present disclosure may be implemented in various forms but cannot be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

As mentioned above, the routing technologies commonly used in a legacy network architecture no longer satisfy the requirement of the next-generation network interconnected architecture. Inventors of the present disclosure realize that the next generation network should at least have the following properties:

1) End-to-end Service Level Objective (SLO) oriented: from the perspective of end users and applications, an end-to-end network performance (such as SLO and the like) is the most important consideration, while a performance between intermediate nodes is not important.
2) Application awareness: the traffic of present applications (such as HyperText Transfer Protocol (HTTP) traffic), is complicated, and many different applications and webpages are running at the same port. Therefore, it is not sufficient to differentiate traffic types by using port numbers and Internet Protocol (IP) addresses. Meanwhile, different applications have different network requirements and SLOs. For example, some applications are latency sensitive while some others are bandwidth sensitive. In this case, the network should have a capability of handling these applications through different ways, i.e., application awareness.
3) Dynamic intelligence: the network should be able to learn from the network environment changing over time and deal with an uncertain environment by utilizing artificial intelligence.
4) Decentralized: as described above, for a controller-based network architecture, such as a Software Defined Network (SDN) and the like, the controller has been the bottleneck of the entire network. Therefore, problems (such as, performance bottleneck of the controller and single point of failure problem) in a centralized architecture (such as SDN and the like) are expected to be solved through the use of a decentralized architecture.

In order to implement a network with the above attributes and satisfy the evolving technical requirements, example embodiments of the present disclosure provide a decentralized network architecture for detecting a network topology, to collect identity information of each associated node and inter-node latency in the network, thereby providing reliable support for various path optimization strategies as much as possible.

FIG. 1 illustrates a block diagram of an example network 100 in which embodiments of the present disclosure can be implemented therein. As shown in FIG. 1, the network 100 includes a plurality of nodes 110, 120-1 to 120-6, and 130, wherein the nodes 110 and 130 are edge nodes, and the nodes 120-1 to 120-6 are intermediate nodes (which are collectively referred to as nodes 120 below) between the edge nodes 100 and 130.

In the context of the present disclosure, the edge node refers to a network node deployed at or adjacent to a terminal user in a network interconnected architecture. The edge node has better response capability and connection speed for final access users.

The edge node 110 may be deployed with a storage device which is configured to store reference positions and reference performances of nodes in the network 100. If an obtained position of a node is not consistent with the reference position of the node stored in the storage device, the edge node 110 updates the reference position of the node stored in the storage device with the obtained position. In other words, when latency or a connection relation of the nodes in the network changes, the topology stored in the storage device of the edge node 110 may be updated according to the detection method of this present disclosure.

It should be appreciated that the structure of the network 100 is described merely as an example, without suggesting any limitation to the scope of the present disclosure. For example, the network 100 may include any number and any type of nodes, and embodiments of the present application may be applied to a network different from the network 100. In some embodiments, the edge node 110 may be any end node within the network interconnected architecture. In some embodiments, the intermediate nodes between the edge nodes 110 and 130 may include any appropriate number of intermediate nodes, rather than being limited to the six nodes 120-1 to 120-6 as shown.

In embodiments of the present disclosure, there may be network traffic between respective nodes 110, 120 and 130 in the network 100. In some embodiments, the network traffic is generated by applications running on the edge node 110.

Traditionally, when data are transmitted from the edge node 110 to the edge node (i.e., the destination node) 130 (for example, the network traffic generated by the applications is forwarded to the destination node 130), there may be many possible paths. If a shortest path strategy or an optimum path strategy is adopted, it may be determined that the shortest path is the path 101 from the edge node 110 to the edge node 130 via the nodes 120-1, 120-3 and 120-6. This means that the traffic of all applications running at the edge node 110 is to be forwarded to the destination node 130 via the path 101.

However, as mentioned above, different applications running simultaneously at the edge node 110 may have different network requirements and SLOs, respectively. As such, it is inappropriate to employ the same routing strategy for different types of data generated by these applications. In the following scenario, it is assumed that the link from the node 120-3 directly to the node 120-6 has high latency, while the link from the node 120-1 to the node 120-6 via the nodes 120-2 and 120-5 has low latency. If the data to be transmitted is generated by a latency-sensitive application (i.e., the SLO being interested with low latency), a path 102 from the node 110 to the node 130 via the nodes 120-1, 120-2, 120-5 and 120-6 is preferred to be the shortest path 101 apparently for such data.

As can be seen above, acquiring a topology, in particular acquiring a topology structure of a network updated in real time, is of great importance to the path optimization strategy. None of the existing network protocols, such as Simple Network Management Protocol (SNMP), INT and NETCONF+YANG-Push, can provide a capability of detecting a network topology.

Embodiments of the present disclosure provide a solution for generating a network topology, so as to solve the above-mentioned problem and one or more of other potential problems. The solution can acquire latency between any two adjacent nodes and identity information of each node in a network, to meet the requirement for updating the network topology in real time.

Figure 2:
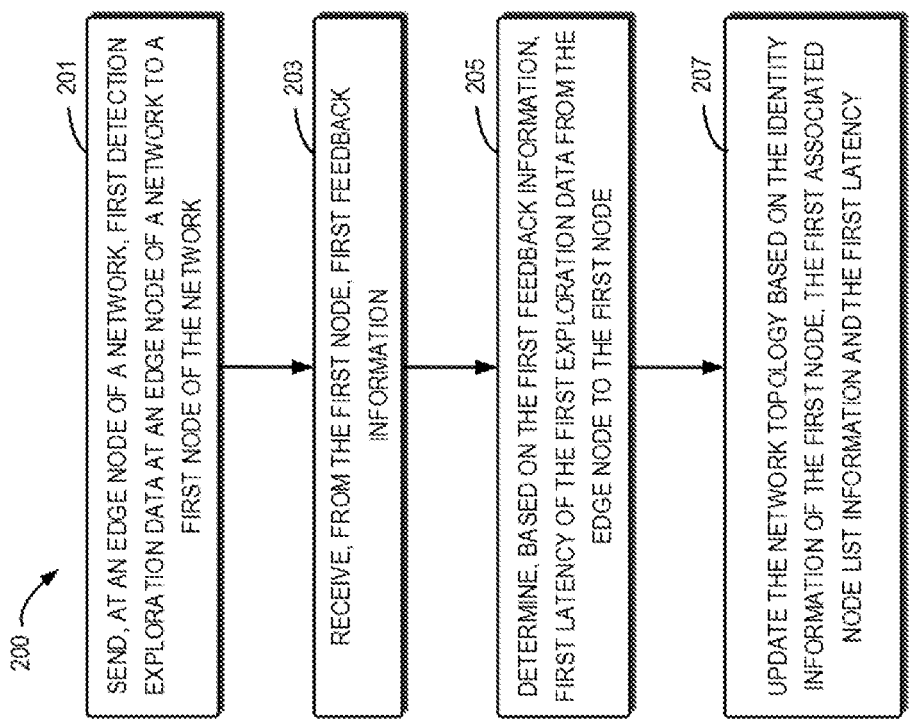
FIG. 2 illustrates a flowchart of a process of generating a network topology according to embodiments of the present disclosure.

FIG. 2 illustrates a flowchart of a process 200 of generating a network topology according to embodiments of the present disclosure. In some embodiments, the process 200 may be performed by the edge node 110 in FIG. 1, or may be performed by a computing device inside the edge node 110. For example, the process 200 may be implemented in the network 100 as shown in FIG. 1. Reference will now be made to FIG. 2 to describe the process 200 of generating a network topology according to embodiments of the present disclosure. For ease of understanding, the specific data as mentioned below is exemplary, without suggesting any limitation to the protection scope of the present disclosure.

At 201, first exploration data may be sent at an edge node of the network 100 to a first node of the network 100. As shown in FIG. 1, the first exploration data may be sent from the edge node 110 to the node 120-1. It would be appreciated that the edge node 110 may send exploration data to the node 120-1 directly connected thereto. Alternatively or in addition, exploration data may be sent to the nodes associated with the node 120-1 in the network (such as, node 120-2) rather than the node 120-1 in the nodes 120 based on IP address information of the nodes associated with the node 120-1.

At 203, first feedback information for the first exploration data may be received from the first node. In some embodiments, the first feedback information may include identity information of the first node and first associated node list information. The first associated node list information includes identity information of nodes associated with the first node in the network 100. As shown in FIG. 1, feedback information for the exploration data from the node 120-1 may be received at the edge node 110. The feedback information includes identity information of the node 120-1, for example, label information in Multi-Protocol Label Switching (MPLS). The label information is associated with the address information of the node 120-1, to avoid a complicated operation of parsing address information in a switching process. In addition, the feedback information further includes a list including the label information of nodes associated with the node 120-1. For example, the list may include the label information of the next hop nodes (i.e., nodes 120-2 and 120-3) of the node 120-1. It would be appreciated that label information of any node adjacent to the node 120-1 can be included in the list of the node 120-1.

At 205, first latency of the first exploration data from the edge node to the first node may be determined based on the first feedback information. For example, timing may be started when the edge node 110 sends the exploration data, and timing may be ended when the edge node 110 receives the feedback information from the node 120-1, such that a round-trip time length of the exploration data between the edge node 110 and the node 120-1 can be obtained. Based on this time length (for example, dividing the time length by 2), the latency from the edge node 110 to the node 120-1 may be determined.

At 207, the network topology may be updated based on the identity information of the first node, the first associated node list information and the first latency. In other words, as shown in FIG. 1, by sending exploration data once or multiple times, the label of the detected node 120-1, the list including labels of the nodes 120-2 and 120-3 adjacent to the node 120-1, and the latency from the edge node 110 to the node 120-1 can be acquired. Based on the information, the information related to the node 120-1 can be updated into the network topology.

Figure 3:
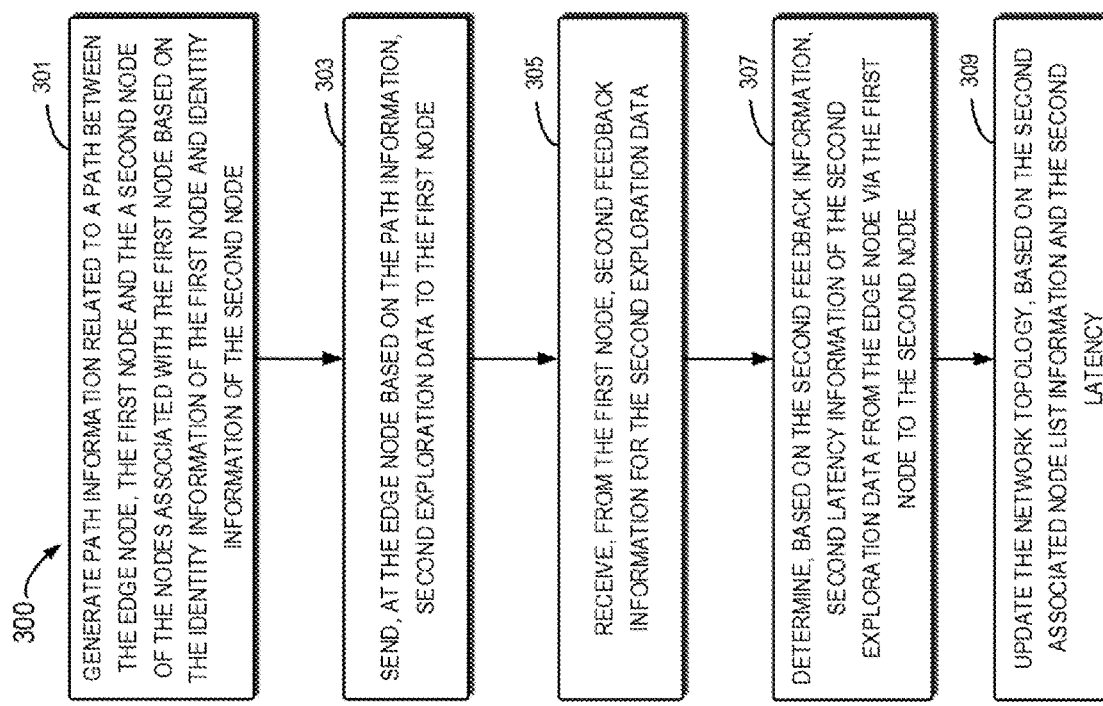
FIG. 3 illustrates a flowchart of a process of generating a network topology according to embodiments of the present disclosure.

FIG. 3 illustrates a flowchart of a process 300 of generating a network topology according to embodiments of the present disclosure. In some embodiments, the process 300 may be performed by the edge node 110 in FIG. 1, or may be performed by a computing device inside the edge node 110. For example, the process 300 may be implemented in the network 100 as shown in FIG. 1. Reference will now be made to FIG. 3 to describe the process 300 of generating a network topology according to embodiments of the present disclosure. For ease of understanding, the specific data as mentioned below is exemplary, without suggesting any limitation to the protection scope of the present disclosure.

At 301, path information related to a path between the edge nodes, the first node and the second node may be generated based on the identity information of the first node and the identity information of the second node of the nodes associated with the first node. As shown in FIG. 1, assuming that the exploration data is to be sent to the node 120-3 adjacent to the node 120-1, label information of the node 120-1 and the label information of the node 120-3 may be added to the path information, thereby enabling the path information to indicate a transmission path of the exploration data from the node 120-1 to the node 120-3. Likewise, assuming that the network typology includes associated node list information of the node 120-2, the exploration data may be sent to the node 120-4. For example, the label information of the nodes 120-1, 120-2 and 120-4 may be added to the path information, thereby enabling the path information to indicate the transmission path via the nodes 120-1 and 120-2 to the node 120-4 for the exploration data.

In this way, the transmission path of the exploration data can be customized, thereby ensuring that the data can reach a certain intermediate node according to the customized path and return to the edge node following the same path, such that latency from an edge node to an intermediate node can be measured accurately.

At 303, second exploration data may be sent at the edge node to the first node based on the path information, to cause the first node to send the second exploration data to the second node. It should be appreciated that the second exploration data includes the path information. As shown in FIG. 1, the exploration data may be sent at the edge node 110 to the node 120-3 via the node 120-1. The node 120-1 may be configured to parse the path information from the exploration data, and move the label information of the node 120-1 to other positions in the exploration data, to facilitate generation of a return path of feedback information for the exploration data in the subsequent process.

At 305, second feedback information of the second node for the second exploration data may be received from the first node. The second feedback information includes second associated node list information of the second node, which includes identity information of nodes associated with the second node in the network 100. As shown in FIG. 1, the feedback information returned from the node 120-3 via the node 120-1 may be received at the edge node 110. The feedback information includes identity information of the node 120-3, for example, label information in Multi-Protocol Label Switching (MPLS). The label information is associated with the address information of the node 120-3, to avoid a complicated operation of parsing the address information in the switching process. In addition, the feedback information further includes a list which includes label information of nodes associated with the node 120-3. For example, the list may include label information of the next hop node 120-6 of the node 120-3.

At 307, second latency information of the second exploration data from the edge node to the second node via the first node may be determined based on the second feedback information. For example, timing may be started when the edge node 110 sends the exploration data, and thereafter, the exploration data transmitted from the edge node 110 to the node 120-3 via the node 120-1 and then transmitted from the node 120-3 back to the edge node 110 via the node 120-1. Timing may be ended when the edge node 110 receives the feedback information from the node 120-1, such that a round-trip time length of the exploration data between the edge node 110 and the node 120-3 can be obtained. Based on this time length (for example, dividing the time length by 2), the latency from the edge node 110 to the node 120-3 may be determined.

At 309, the network topology may be updated based on the second associated node list information and the second latency information. By that analogy, the latency from the edge node to any node of the nodes 120 and the respective label information can be obtained for updating the network topology. In this way, label information of each node and inter-node latency in the network 100 can be obtained to provide an accurate data support for path optimization.

Determining latency as shown in FIG. 3 will be further described below.

Figure 4:
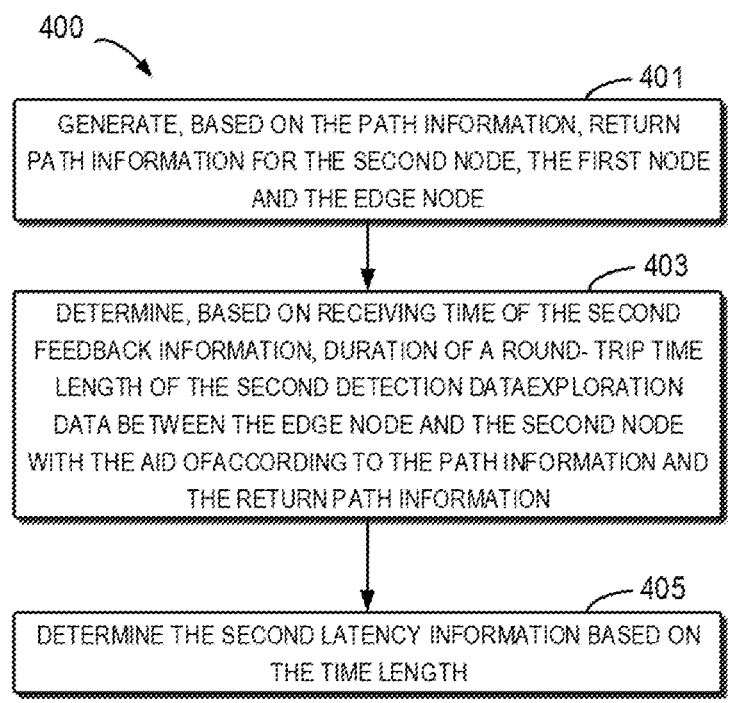
FIG. 4 illustrates a flowchart of a process of generating a network topology according to embodiments of the present disclosure.

FIG. 4 illustrates a flowchart of a process 400 of generating a network topology according to embodiments of the present disclosure, which shows a specific process of determining latency. In some embodiments, the process 400 may be performed by the edge node 110 in FIG. 1, or may be performed by a computing device inside the edge node 110.

For example, the process 400 may be implemented in the network 100 as shown in FIG. 1. Reference will now made to FIG. 4 to describe the process 400 of generating a network topology according to embodiments of the present disclosure. For ease of understanding, the specific data as mentioned below is exemplary, without suggesting any limitation to the protection scope of the present disclosure.

At 401, return path information for the second node, the first node and the edge node may be generated based on the path information. The return path information indicates a return path opposite to the path related to the path information. For example, if the path information indicates a path from the edge node 110 to the node 120-3 via the node 120-1, a return path from the node 120-3 to the edge node 110 via the node 120-1 may be determined based on the path information. In another example, if there is a need for sending detection data from the edge node 110 to the node 120-6 via the path 102, it is required to add respective label information of nodes 120-1, 120-2, 120-5 and 120-6 into the path information sequentially. The edge node 110 first sends the exploration data to the node 120-1 based on the label of the node 120-1. Subsequently, the node 120-1 moves the label of itself into the return path information and sends the exploration data including the return path information to the node 120-3 based on the label of the node 120-3. By that analogy, after the exploration data reaches the node 120-6, the node 120-6 sends the exploration data to the node 120-5 based on the label of the node 120-5 in the return path information, and continues until the exploration data returns to the edge.

At 403, based on receiving time of the second feedback information, a round-trip time length of the second exploration data between the edge node and the second node may be determined according to the path information and the return information. As aforementioned, time length of the exploration data via the path 102 to the node 120-6 and then via a path opposite to the path 102 to the edge node 110 may be determined based on the time point at which the feedback information is received.

At 405, second latency information may be determined based on the time length. For example, a half of the time length is the latency from the edge node 110 to the node 120-6 via the path 102.

In some embodiments, latency between the first node and the second node may be determined based on the first latency and the second latency. As a result, latency between any adjacent nodes of the nodes 120 can be obtained. In addition, the network topology may be updated based on the latency between every two adjacent nodes.

In some embodiments, the first node is a next hop node of the edge node, and the second node is a next hop node of the first node. Of course, it would be appreciated that the technical solution of the present disclosure is not limited to nodes one hop away from each other, but instead can determine latency between any two associated nodes.

Figure 5:
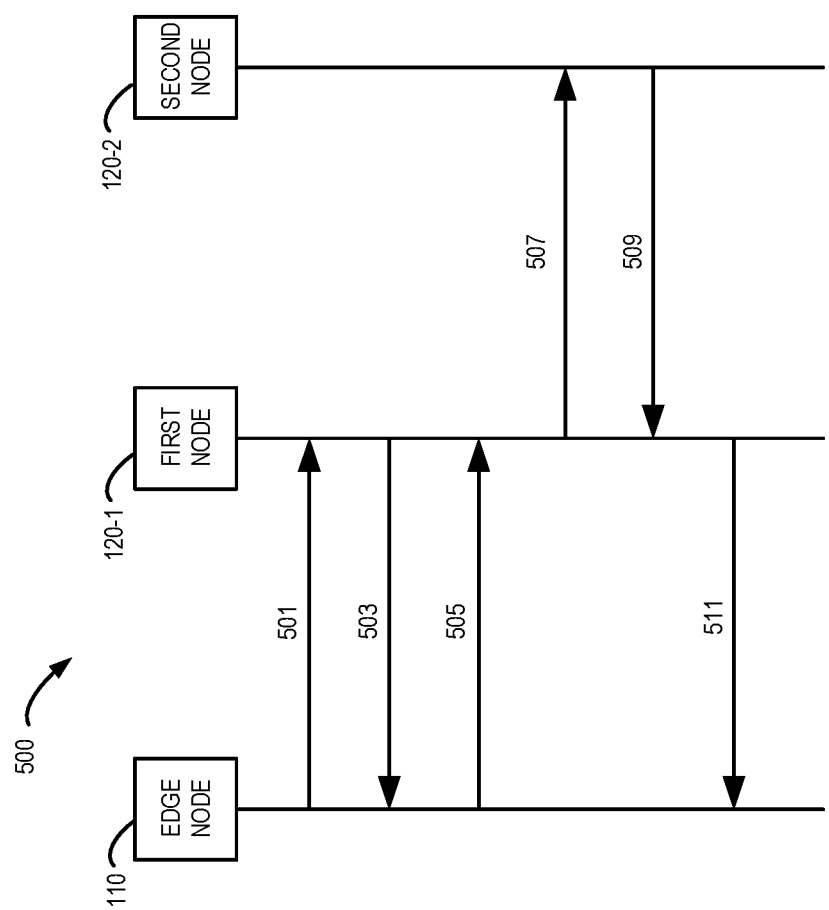
FIG. 5 illustrates a signaling chart of a process of generating a network topology according to embodiments of the present disclosure.

FIG. 5 illustrates a signaling chart 500 of a process of generating a network topology according to embodiments of the present disclosure. FIG. 5 is provided only as an example that the edge node is the edge node 110, and the first node and the second node are the nodes 120-1 and 120-2, respectively. In other embodiments, the edge node may be the edge node 130, and the first node and the second may be any node of the nodes 120. As shown in FIG. 5, the edge node 110 first sends 501 the exploration data to the node 120-1, and then the node 120-1 sends 503 associated node list information and latency to the edge node 110. Since the associated node list information includes label information of the node 120-2 adjacent to the node 120-1, the edge node 110 may send the exploration data further to the node 120-2 based on the label information. In order to obtain latency between the nodes 120-1 and 120-2, it is necessary to define that the exploration data should still be transmitted to the node 120-2 via the node 120-1 and then returns to the edge node 110 following the same path. That is, the exploration data is first sent 505 to the node 120-1 and then forwarded 507 by the node 120-1 to the node 120-2. After obtaining the feedback information for the exploration data, the node 120-2 sends 509 the feedback information to the node 120-1, and then the node 120-1 sends 511 the feedback information to the edge node 110.

Figure 6:
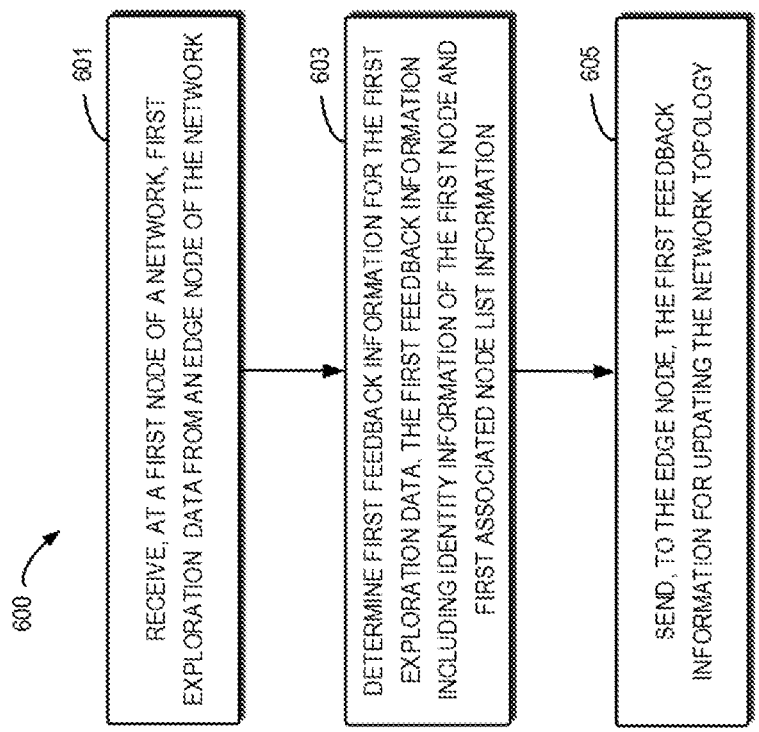
FIG. 6 illustrates a flowchart of a process of generating a network topology according to embodiments of the present disclosure.

FIG. 6 illustrates a flowchart of a process of generating a network topology according to embodiments of the present disclosure. In some embodiments, the process 600 may be performed by, for example, the node 120-1 in FIG. 1, or may be performed by a computing device inside the node 120-1. For example, the process 600 may be implemented in the network 100 as shown in FIG. 1. Reference will now be made to FIG. 6 to describe the process 600 of generating a network topology according to embodiments of the present disclosure. For ease of understanding, the specific data as mentioned below is exemplary, without suggesting any limitation to the protection scope of the present disclosure.

At 601, first exploration data may be received at the node 120-1 of the network 100 from the edge node 110 of the network 100.

At 603, first feedback information for the first exploration data may be determined. The first feedback information includes identity information of the node 120-1 and first associated node list information. The first associated node list information includes identity information (such as, label information) of the nodes 120-2 and 120-3 associated with the node 120-1 in the network 110.

At 605, the first feedback information may be sent to the edge node 110 for updating the network topology.

In addition, second exploration data may be received from the edge node 110. The second exploration data may include path information generated based on the label information of the node 120-1 and label information of the second node 120-2 of the nodes associated with the first node. The path information is related to the path between the edge node 110, the node 120-1 and the node 120-2. For example, the path information may indicate a path from the edge node 110 via the node 120-1 to the node 120-2.

Subsequently, the second exploration data may be sent to the node 120-2 based on the path information, and second feedback information of the node 120-2 for the second exploration data may be received at the node 120-1. The second feedback information includes second associated node list information of the node 120-2. The second associated node list information includes label information of nodes associated with the node 120-2 in the network 100. The second feedback information may be sent to the edge node 110 for updating the network topology finally. In this way, an edge node not only has application awareness and a decision-making authority for path optimization, but can also enable dynamic configuration and decentralization of the network.

Through the above embodiments, the present disclosure can acquire latency between any two adjacent nodes and identity information of respective nodes in a network, to satisfy the requirement for updating a network topology in real time. Moreover, when a connection relation between nodes in the network is changed, inter-node latency can be determined in time by updating the network topology in real time so that an accurate data support can be provided for path optimization.

Figure 7:
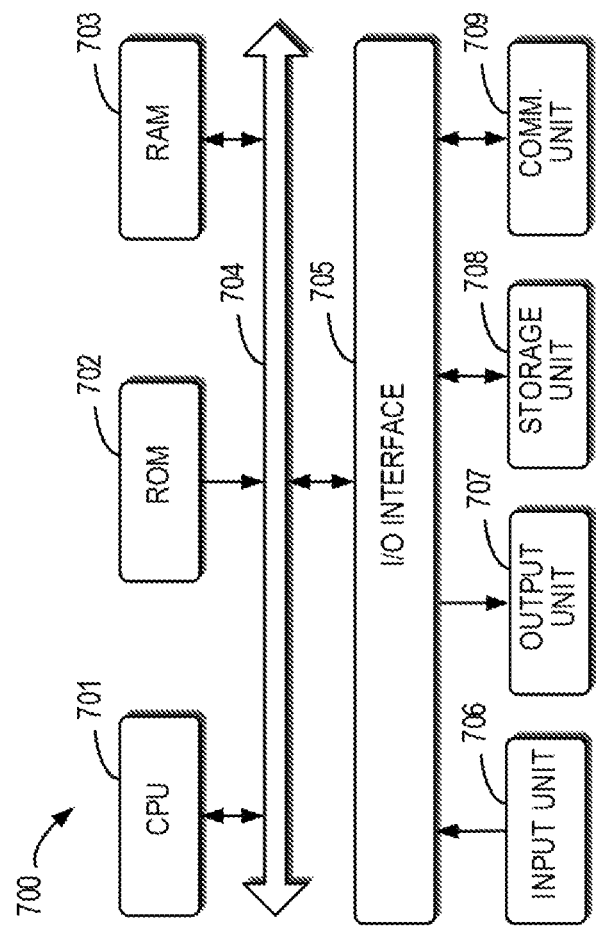
FIG. 7 illustrates a schematic block diagram of an example device that can be used to implement embodiments of the present disclosure.

FIG. 7 illustrates a schematic block diagram of an example device 700 that can be used to implement embodiments of the present disclosure. As shown, the device 700 includes a central processing unit (CPU) 701 which performs various appropriate acts and processing, based on computer program instructions stored in a read-only memory (ROM) 702 or computer program instructions loaded from a storage unit 708 to a random access memory (RAM) 703. The RAM 703 stores all kinds of programs and data required for operations of the device 700. The CPU 701, the ROM 702 and the RAM 703 are connected via a bus 704 with one another. An input/output (I/O) interface 705 is also connected to the bus 704.

A plurality of components in the device 700 are connected to the I/O interface 705: an input unit 706, for example, a keyboard, a mouse and the like; an output unit 707, for example, various kinds of displays and loudspeakers etc.; a storage unit 708, for example, a magnetic disk, an optical disk, and etc.; a communication unit 709, for example a network card, a modem, and a wireless communication transceiver, etc. The communication unit 709 allows the device 700 to exchange information/data with other devices through a computer network such as the Internet, and/or various kinds of telecommunications networks.

Various processes and processing described above, for example, the process 200, 300, 400 and/or 600, may be executed by the processing unit 701. For example, in some embodiments, the process 200, 300, 400 and/or 600 may be implemented as a computer software program that is tangibly included in a machine-readable medium, for example, the storage unit 708. In some embodiments, part or all of the computer programs may be loaded and/or mounted onto the device 700 via ROM 702 and/or communication unit 709. When the computer programs are loaded to the RAM 703 and executed by the CPU 701, one or more steps of the process 200, 300, 400 and/or 600 as described above may be executed.

The present disclosure may be a method, a device, a system, and/or a computer program product. The computer program product may include a computer-readable storage medium having computer-readable program instructions thereon for performing aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals sent through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer-readable program instructions may also be stored in a computer-readable storage medium that can direct a computer, a programmable data processing device, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing device, or other devices to cause a series of operational steps to be performed on the computer, other programmable devices or other device to produce a computer-implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures.

For example, two blocks in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of generating a network topology, comprising:

sending, at an edge node of a network, first exploration data to a first node of the network;

receiving, from the first node, first feedback information for the first exploration data, the first feedback information including identity information of the first node and first associated node list information, the first associated node list information including identity information of a second node of one or more nodes associated with the first node in the network;

determining, based on the first feedback information, first latency information of the first exploration data from the edge node to the first node;

generating path information related to a path between the edge node, the first node and the second node based on the identity information of the first node and identity information of the second node;

sending, at the edge node based on the path information, second exploration data to the first node to enable the first node to send the second exploration data to the second node, the second exploration data including the path information;

receiving, from the first node, second feedback information of the second node for the second exploration data;

determining, based on the second feedback information, second latency information of the second exploration data from the edge node via the first node to the second node; and updating network topology of the network based on the identity information of the first node and the second node, and the first latency information and the second latency information.

2. The method of claim 1, wherein:

the second feedback information includes second associated node list information of the second node, the second associated node list information including identity information of one or more nodes associated with the second node in the network.

3. The method of claim 2, wherein determining the second latency information comprises:

generating, based on the path information, return path information for the second node, the first node and the edge node, the return path information indicating a return path opposite to the path related to the path information;

determining, based on receiving time of the second feedback information, a round-trip time length of the second exploration data between the edge node and the second node according to the path information and the return path information; and determining the second latency information based on the time length.

4. The method of claim 2, further comprising:

determining latency between the first node and the second node based on the first latency information and second latency information; and updating the network topology based on the latency between the first node and the second node.

5. The method of claim 2, wherein the first node is a next hop node of the edge node, and the second node is a next hop node of the first node.

6. A computer program product tangibly stored on a non-transitory computer storage medium and including machine-executable instructions, the machine executable instructions, when executed by a device, causing the device to perform steps of the method of claim 1.

7. An electronic device, comprising:

at least one processing unit; and at least one memory coupled to the at least one processing unit and storing instructions for execution by the at least one processing unit, the instructions, when executed by the at least one processing unit, causing the device to perform acts comprising:

sending, at an edge node of a network, first exploration data to a first node of the network;

receiving, from the first node, first feedback information for the first exploration data, the first feedback information including identity information of the first node and first associated node list information, the first associated node list information including identity information of a second node of one or more nodes associated with the first node in the network;

determining, based on the first feedback information, first latency information of the first exploration data from the edge node to the first node;

generating path information related to a path between the edge node, the first node and the second node based on the identity information of the first node and identity information of the second node;

sending, at the edge node based on the path information, second exploration data to the first node to enable the first node to send the second exploration data to the second node, the second exploration data including the path information;

receiving, from the first node, second feedback information of the second node for the second exploration data;

determining, based on the second feedback information, second latency information of the second exploration data from the edge node via the first node to the second node; and updating network topology of the network based on the identity information of the first node and the second node, and the first latency information and the second latency information.

8. The electronic device of claim 7, wherein:

the second feedback information includes second associated node list information of the second node, the second associated node list information including identity information of one or more nodes associated with the second node in the network.

9. The electronic device of claim 8, wherein determining the second latency information comprises:

generating, based on the path information, return path information for the second node, the first node and the edge node, the return path information indicating a return path opposite to the path related to the path information;

determining, based on receiving time of the second feedback information, a round-trip time length of the second exploration data between the edge node and the second node according to the path information and the return path information; and determining the second latency information based on the time length.

10. The electronic device of claim 8, wherein the acts further comprise:

determining latency between the first node and the second node based on the first latency information and the second latency information; and updating the network topology based on the latency between the first node and the second node.

11. The electronic device of claim 8, wherein the first node is a next hop node of the edge node, and the second node is a next hop node of the first node.

12. A method of generating a network topology, comprising:

receiving, at a first node of a network, first exploration data from an edge node of the network;

determining first feedback information for the first exploration data, the first feedback information including identity information of the first node and first associated node list information, the first associated node list information including identity information of one or more nodes associated with the first node in the network;

receiving second exploration data from the edge node, the second exploration data including path information generated based on the identity information of the first node and identity information of a second node of the one or more nodes associated with the first node, the path information related to a path between the edge node, the first node and the second node;

sending, based on the path information, the second exploration data to the second node;

receiving, from the second node, second feedback information for the second exploration data; and sending, to the edge node, the first feedback information and the second feedback information for updating network topology of the network.

13. The method of claim 12, wherein:

the second feedback information includes second associated node list information of the second node, the second associated node list information including identity information of one or more nodes associated with the second node in the network.

14. The method of claim 13, wherein the first node is a next hop node of the edge node, and the second node is a next hop node of the first node.

15. A computer program product tangibly stored on a non-transitory computer storage medium and including machine-executable instructions, the machine executable instructions, when executed by a device, causing the device to perform steps of the method of claim 12.

16. The computer program product of claim 15, wherein:

the second feedback information includes second associated node list information of the second node, the second associated node list information including identity information of one or more nodes associated with the second node in the network.

17. The computer program product of claim 16, wherein the first node is a next hop node of the edge node, and the second node is a next hop node of the first node.

18. An electronic device, comprising at least one processing unit and at least one memory coupled to the at least one processing unit and storing instructions for execution by the at least one processing unit, the instructions, when executed by the at least one processing unit, causing the device to perform acts of claim 12.

19. The electronic device of claim 18, wherein:

the second feedback information includes second associated node list information of the second node, the second associated node list information including identity information of one or more nodes associated with the second node in the network.

20. The electronic device of claim 19, wherein the first node is a next hop node of the edge node, and the second node is a next hop node of the first node.

\* \* \* \* \*